(12) United States Patent
Huffman

(10) Patent No.: US 11,090,988 B2
(45) Date of Patent: Aug. 17, 2021

(54) DUAL TIRE CHAIN BLOCK

(71) Applicant: Todd Huffman, Roosevelt, UT (US)

(72) Inventor: Todd Huffman, Roosevelt, UT (US)

( * ) Notice: Subject to any disclaimer, the term of this patent is extended or adjusted under 35 U.S.C. 154(b) by 365 days.

(21) Appl. No.: 16/274,956

(22) Filed: Feb. 13, 2019

(65) Prior Publication Data
US 2020/0254832 A1 Aug. 13, 2020

(51) Int. Cl.
*B66F 1/00* (2006.01)
*B60C 27/00* (2006.01)
*B66F 7/24* (2006.01)

(52) U.S. Cl.
CPC ............ *B60C 27/003* (2013.01); *B66F 7/243* (2013.01)

(58) Field of Classification Search
CPC ................................ B60C 27/003; B66F 7/243
USPC ............................................................ 254/88
See application file for complete search history.

(56) References Cited

U.S. PATENT DOCUMENTS

| | | | |
|---|---|---|---|
| 1,189,632 A * | 7/1916 | Seitz | B66F 7/243 254/88 |
| 3,937,263 A | 2/1976 | Hill | |
| 4,031,939 A | 6/1977 | De Martini | |
| 4,103,870 A * | 8/1978 | Murakami | B60C 27/00 152/213 R |
| 4,249,657 A * | 2/1981 | Bates | B60C 27/00 206/335 |
| 4,513,800 A | 4/1985 | Vossenkemper | |
| 4,709,432 A | 12/1987 | Barrick | |
| 5,400,846 A * | 3/1995 | Bowman | B60C 27/003 14/69.5 |
| 6,047,754 A | 4/2000 | Drum | |
| 6,681,657 B2 | 1/2004 | Lyne | |
| 6,863,101 B2 | 3/2005 | Airoldi | |
| D594,398 S | 6/2009 | Tai | |
| 2015/0075687 A1* | 3/2015 | McCloud | B60C 27/003 152/213 R |

\* cited by examiner

*Primary Examiner* — Orlando E Aviles
*Assistant Examiner* — Jonathan G Santiago Martinez

(57) ABSTRACT

A dual tire chain block for adding and removing chains to dual tire trucks includes a block base having a front side sloping from a bottom side to a top side to form a front ramp. A pair of chain mounts is coupled to the inner side and the outer side proximal the front side. A capture chain is coupled to the pair of chain mounts. The capture chain extends between the pair of chain mounts to form a U-shape adjacent the front side of the block base. The capture chain is configured to be driven on by a truck to prevent the block base from slipping away as the truck tires climb the front ramp to rest an inner tire on the top side to elevate an outer tire to receive or remove a snow chain.

10 Claims, 4 Drawing Sheets

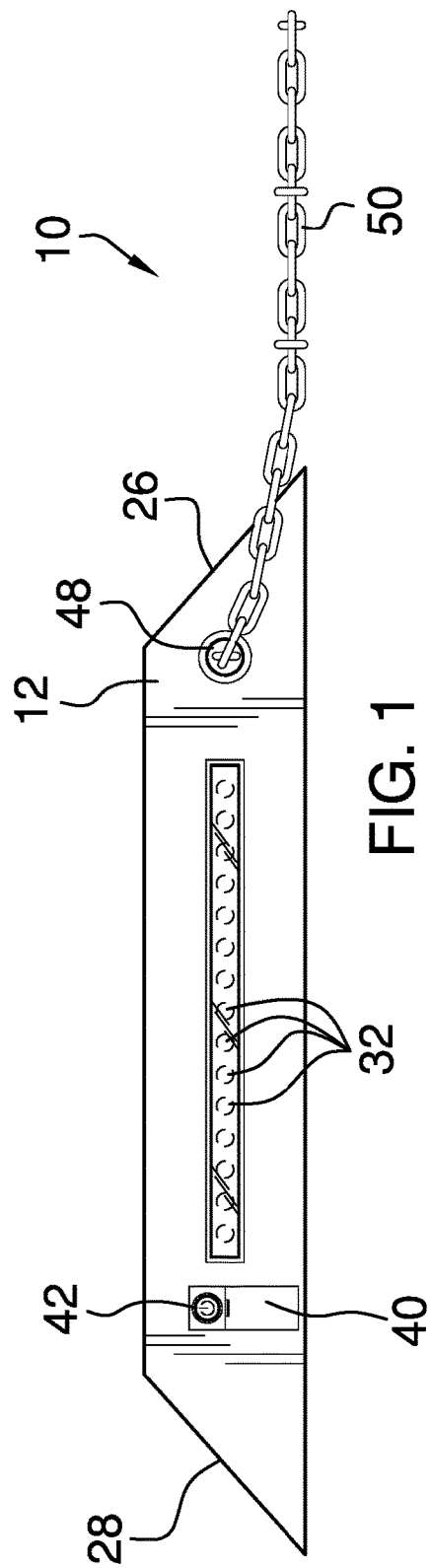
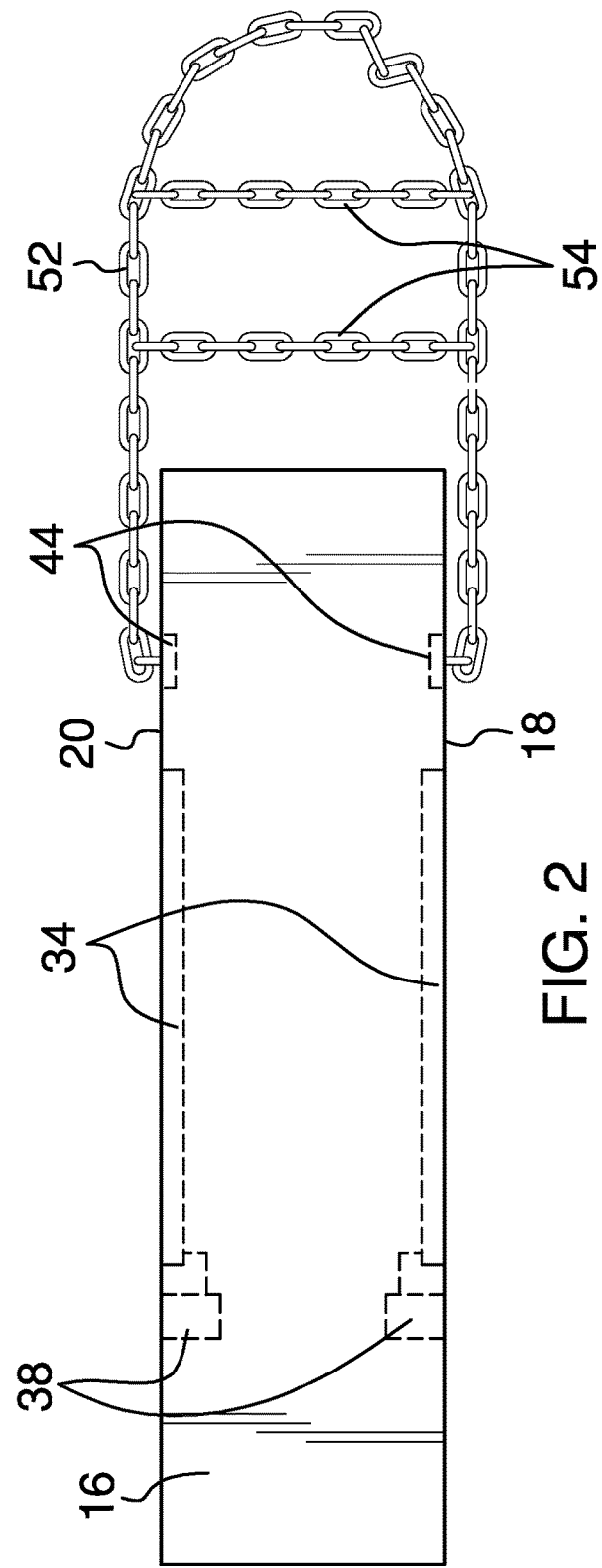

DUAL TIRE CHAIN BLOCK

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to tire blocks and more particularly pertains to a new tire block for adding and removing chains to dual tire trucks.

BRIEF SUMMARY OF THE INVENTION

An embodiment of the disclosure meets the needs presented above by generally comprising a block base having a top side separated from a bottom side, an inner side separated from an outer side, and a front side separated from a back side. The front side slopes from the bottom side to the top side to form a front ramp. A pair of chain mounts is coupled to the inner side and the outer side proximal the front side. A capture chain is coupled to the pair of chain mounts. The capture chain extends between the pair of chain mounts to form a U-shape adjacent the front side of the block base. The capture chain is configured to be driven on by a truck to prevent the block base from slipping away as the truck tires climb the front ramp to rest an inner tire on the top side to elevate an outer tire to receive or remove a snow chain.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a side elevation view of a dual tire chain block according to an embodiment of the disclosure.

FIG. 2 is a bottom plan view of an embodiment of the disclosure.

DETAILED DESCRIPTION OF THE INVENTION

Figure 3:
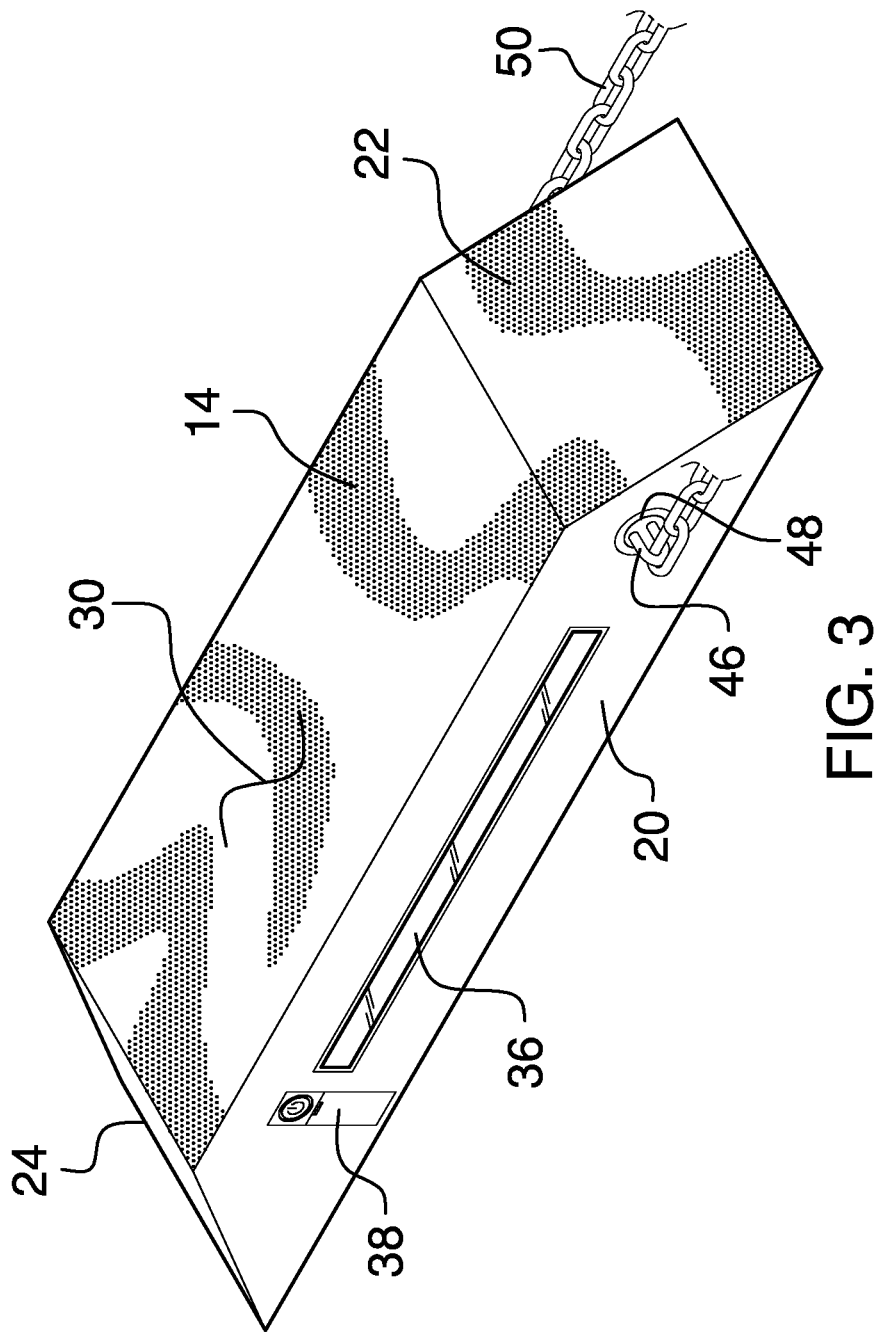
FIG. 3 is an isometric view of an embodiment of the disclosure.
Figure 4:
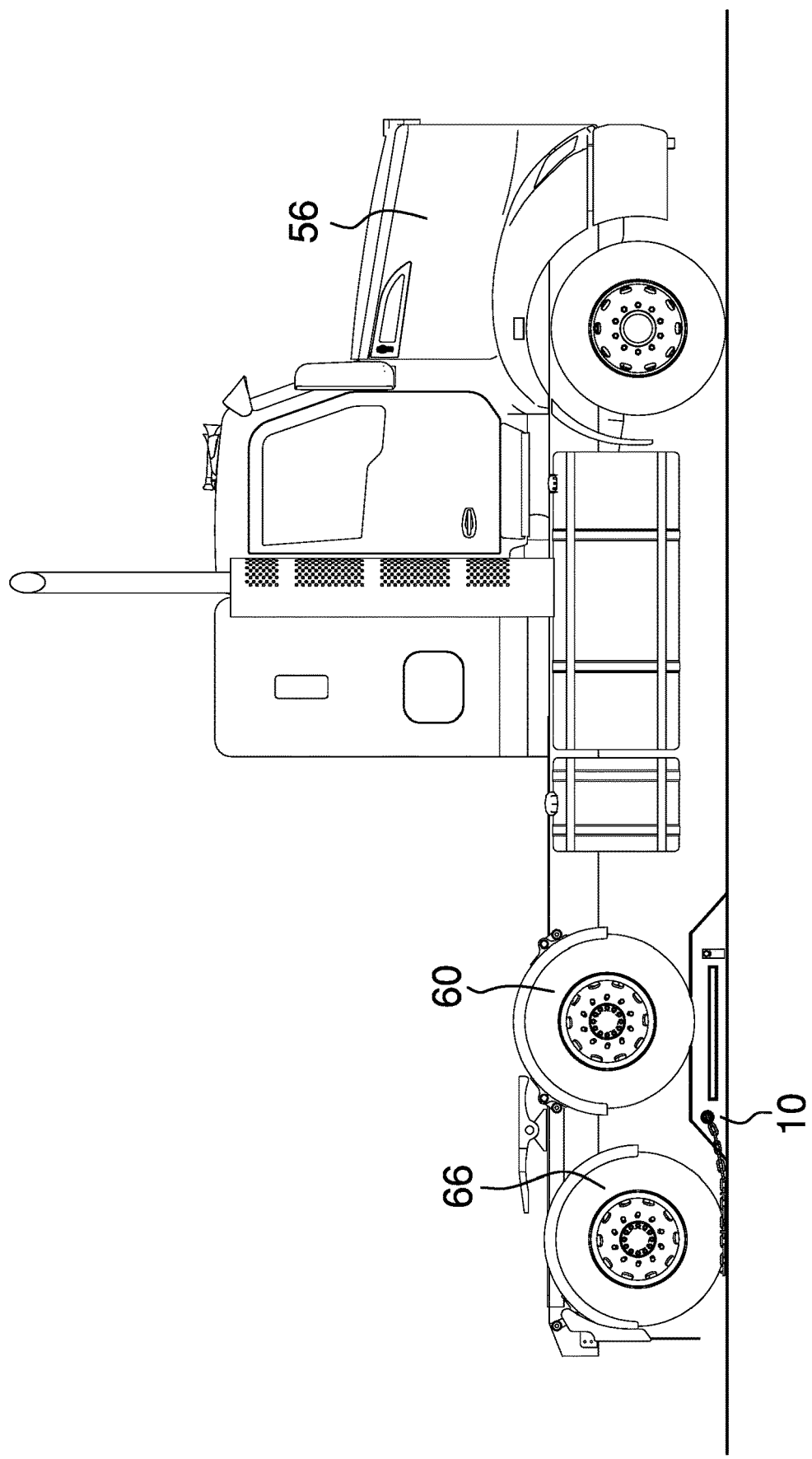
FIG. 4 is an in-use view of an embodiment of the disclosure.
Figure 5:
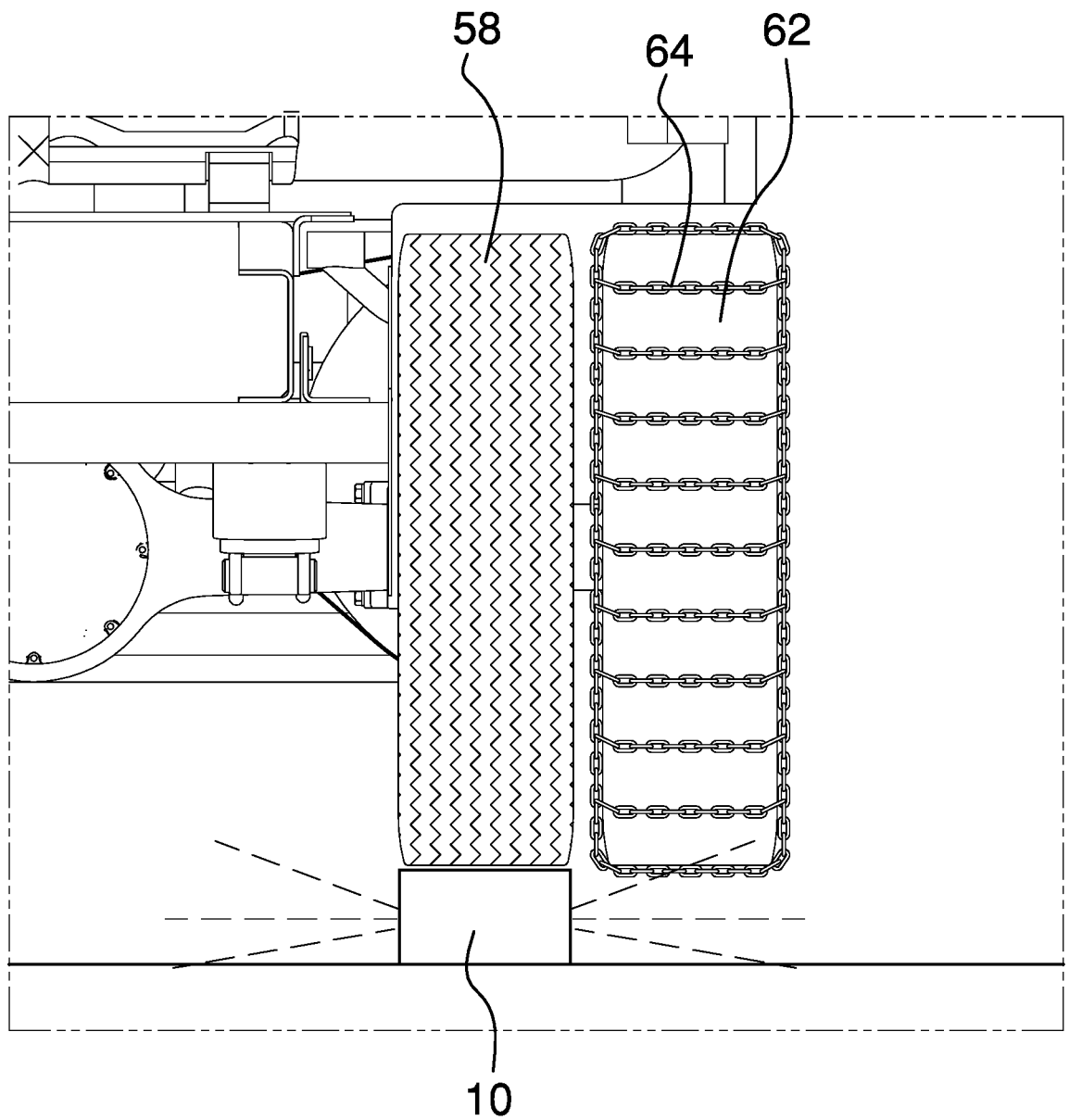
FIG. 5 is an in-use view of an embodiment of the disclosure.

With reference now to the drawings, and in particular to FIGS. 1 through 5 thereof, a new tire block embodying the principles and concepts of an embodiment of the disclosure and generally designated by the reference numeral 10 will be described.

As best illustrated in FIGS. 1 through 5, the dual tire chain block 10 generally comprises a block base 12 having a top side 14 separated from a bottom side 16, an inner side 18 separated from an outer side 20, and a front side 22 separated from a back side 24. The front side 22 slopes from the bottom side 16 to the top side 14 to form a front ramp 26. The back side 24 slopes from the bottom side 16 to the top side 14 to form a back ramp 28. The block base 12 may thus be a trapezoidal prism. A nonslip surface 30 may be continuously disposed on each of the front side 22, the top side 14, and the back side 24.

A plurality of LED lights 32 is coupled to the block base 12. The plurality of LED lights 32 may comprise a pair of light strips 34 coupled within the inner side 18 and the outer side 20. Each of the pair of light strips 34 has a rectangular protective cover 36 for protection. A power source 38 is coupled to the block base 12. The power source 38 may comprise a pair of battery compartments 40 and a pair of power buttons 42 coupled within the inner side 18 and the outer side 20 adjacent the pair of light strips 34. The pair of battery compartments 40 is configured to receive a plurality of batteries. The plurality of LED lights 32 is in operational communication with the power source 38 and the pair of power buttons 42 is in operational communication with the pair of battery compartments 40 and the pair light strips 34 to operate each light strip of the pair of light strips 34 individually.

A pair of chain mounts 44 is coupled to the inner side 18 and the outer side 20 of the block base proximal the front side 22. Each of the pair of chain mounts 44 may comprise a D-ring 46 coupled within a circular housing 48. The circular housing 48 may be swivelable. A capture chain 50 is coupled to the pair of chain mounts 44. The capture chain 50 comprises a principal chain 52 extending between the pair of chain mounts 44 to form a U-shape and a plurality of cross chains 54 extending between sections of the principal chain 52.

In use, the capture chain 50 is to driven on by a truck 56 to prevent the block base 12 from slipping away as an inner tire 58 of a pair of truck tires 60 climbs the front ramp 26 to rest the inner tire 58 on the top side 14 and elevate an outer tire 62 of the pair of tires to receive or remove a snow chain 64. The truck 60 may then drive over the block base 12 down the back ramp 28 to raise an adjacent pair of tires 66.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A dual tire chain block comprising:
a block base having a top side separated from a bottom side, an inner side separated from an outer side, and a front side separated from a back side, the front side sloping from the bottom side to the top side to form a front ramp;
a pair of chain mounts coupled to the block base, the pair of chain mounts being coupled to the inner side and the outer side proximal the front side; and spaced from the top side, wherein each of said inner and outer side has a recess and
a capture chain coupled to the pair of chain mounts, the capture chain extending between the pair of chain mounts to form an U-shape adjacent the front side of the block base, the capture chain being configured to be driven on by a truck to prevent the block base from slipping away as an inner tire of a pair of truck tires climbs the front ramp to rest the inner tire on the top side and elevate an outer tire of the pair of tires to receive or remove a snow chain.

2. The dual tire chain block of claim 1 further comprising the back side sloping from the bottom side to the top side to form a back ramp, the block base thus being configured to allow the truck to drive over the block base to raise the an adjacent pair of tires.

3. The dual tire chain block of claim 1 further comprising a nonslip surface coupled to the bock base, the nonslip surface being continuously disposed on each of the front side, the top side, and the back side.

4. The dual tire chain block of claim 1 further comprising the capture chain comprising a principal chain and a plurality of cross chains, the principal chain extending between the pair of chain mounts to form the U-shape and the plurality of cross chains extending between sections of the principal chain.

5. The dual tire chain block of claim 1 further comprising a plurality of LED lights and a power source coupled to the block base, the plurality of LED lights being in operational communication with the power source.

6. The dual tire chain block of claim 5 further comprising the plurality of LED lights comprising a pair of light strips coupled within the inner side and the outer side, the power source comprising a pair of battery compartments and a pair of power buttons coupled within the inner side and the outer side adjacent the pair of light strips, the pair of battery compartments being configured to receive a plurality of batteries to power the plurality of LED lights, the pair of power buttons being in operational communication with the pair of battery compartments and the pair light strips to operate each light strip of the pair of light strips individually.

7. The dual tire chain block of claim 6 further comprising each of the pair of light strips having a rectangular protective cover.

8. The dual tire chain block of claim 1 further comprising each of the pair of chain mounts comprising a D-ring coupled within said recess which is a circular housing.

9. The dual tire chain block of claim 8 further comprising the circular housing being swivelable.

10. A dual tire chain block comprising:
a block base having a top side separated from a bottom side, an inner side separated from an outer side, and a front side separated from a back side, the front side sloping from the bottom side to the top side to form a front ramp, the back side sloping from the bottom side to the top side to form a back ramp, the block base being configured to allow a truck to drive over the block base to raise an adjacent pair of tires;
a nonslip surface coupled to the block base, the nonslip surface being continuously disposed on each of the front side, the top side, and the back side;
a plurality of LED lights coupled to the block base, the plurality of LED lights comprising a pair of light strips coupled within the inner side and the outer side, each of the pair of light strips having a rectangular protective cover;
a power source coupled to the block base, the power source comprising a pair of battery compartments and a pair of power buttons coupled within the inner side and the outer side adjacent the pair of light strips, the pair of battery compartments being configured to receive a plurality of batteries, the plurality of LED lights being in operational communication with the power source, the pair of power buttons being in operational communication with the pair of battery compartments and the pair light strips to operate each light strip of the pair of light strips individually;
a pair of chain mounts coupled to the block base, the pair of chain mounts being coupled to the inner side and the outer side proximal the front side, each of the pair of chain mounts comprising a D-ring coupled within a circular housing, the circular housing being swivelable; and
a capture chain coupled to the pair of chain mounts, the capture chain comprising a principal chain extending between the pair of chain mounts to form an U-Shape and a plurality of cross chains extending between sections of the principal chain, the capture chain being configured to be driven on by the truck to prevent the block base from slipping away as an inner tire of a pair of truck tires climbs the front ramp to rest the inner tire on the top side and elevate an outer tire of the pair of tires to receive or remove a snow chain.

\* \* \* \* \*